United States Patent [19]

Agrawal et al.

[11] Patent Number: 4,595,405
[45] Date of Patent: Jun. 17, 1986

[54] PROCESS FOR THE GENERATION OF GASEOUS AND/OR LIQUID NITROGEN

[75] Inventors: Rakesh Agrawal, Allentown; Steven R. Auvil, Macungie, both of Pa.

[73] Assignee: Air Products and Chemicals, Inc., Allentown, Pa.

[21] Appl. No.: 684,655

[22] Filed: Dec. 21, 1984

[51] Int. Cl.⁴ .................................................. F25J 3/04
[52] U.S. Cl. .............................................. 62/18; 62/26; 62/28; 62/30; 62/31; 62/33; 62/38
[58] Field of Search ..................................... 62/23-33, 62/38, 39, 18, 19; 55/68, 73

[56] References Cited

U.S. PATENT DOCUMENTS

| | | | |
|---|---|---|---|
| 3,905,201 | 9/1975 | Coveney et al. | 62/38 |
| 4,152,130 | 5/1979 | Theobald | 62/18 |
| 4,222,756 | 9/1980 | Thorogood | 62/13 |
| 4,230,463 | 10/1980 | Henis . | |
| 4,372,764 | 2/1983 | Theobald | 62/18 |

FOREIGN PATENT DOCUMENTS 58-156173 9/1983 Japan .
58-151305 9/1983 Japan .

OTHER PUBLICATIONS

I. Chem. E. Symposium Series No. 79, 1983, M. Ruhemann and D. I. Limb, pp. 320-328.

Primary Examiner—Frank Sever
Attorney, Agent, or Firm—Mark L. Rodgers; E. Eugene Innis; James C. Simmons

[57] ABSTRACT

The present invention involves an efficient process for separating components of a gas stream by integrating a cryogenic separation unit and a membrane separation unit. One embodiment provides for the generation of one or more nitrogen-rich streams in the gas or liquid phase, or both, from a stream comprising oxygen and nitrogen; e.g., air.

18 Claims, 4 Drawing Figures

PROCESS FOR THE GENERATION OF GASEOUS AND/OR LIQUID NITROGEN

TECHNICAL FIELD OF THE INVENTION

The present invention relates to a process for separating the components of a multi-component gas stream. One specific embodiment involves the generation of a nitrogen-rich stream in the gas or liquid phase, or both, from a stream comprising nitrogen and oxygen, such as air.

BACKGROUND OF THE INVENTION

The use of nitrogen has become increasingly important in various industrial and commercial operations. For example, liquid nitrogen is used to freeze food, in the cryogenic recycling of tires, as a source of gaseous nitrogen for inerting, etc. Gaseous nitrogen is used in applications such as secondary oil and gas recoveries and as a blanketing gas in metal refineries, metal working operations and chemical processes, etc. In light of the increasing importance of nitrogen in such operations, it is desirable to provide a process which is both economical and efficient for producing nitrogen in the liquid and/or gas phase.

High purity gaseous nitrogen is produced directly by well-known cryogenic separation methods. U.S. Pat. No. 4,222,756 teaches a process and apparatus for producing gaseous nitrogen using multiple distillation columns and associated heat exchangers. Ruhemann and Limb, I. Chem. E. Symposium Series No. 79, pp 320 (1983) advocate a preference for the use of a single distillation column instead of the typical double column for the production of gaseous nitrogen.

Liquid nitrogen is typically produced by initially producing gaseous nitrogen in a cryogenic air separation unit and subsequently treating the gaseous nitrogen in a liquefier. Modified forms of cryogenic air separation units have been developed to directly produce liquid nitrogen. U.S. Pat. No. 4,152,130 discloses a method of producing liquid oxygen and/or liquid nitrogen. This method comprises providing a substantially dry and substantially carbon dioxide free air stream, cryogenically treating the air stream to liquefy a portion of the air stream, and subsequently feeding the air stream into a fractionation column to separate the nitrogen and oxygen, and withdrawing liquid oxygen and/or nitrogen from said column.

The production of medium purity nitrogen or oxygen by noncryogenic air separation processes is achieved by using absorption, adsorption and membrane based processes. U.S. Pat. No. 4,230,463 discloses multicomponent membranes which are effective for separating at least one gas from gaseous mixtures by permeation wherein the multicomponent membranes are comprised of a coating in occluding contact with a porous separation membrane. Selective separation provides preferential depletion or concentration of one or more desired gases in the mixture with respect to at least one other gas in the mixture, thereby producing a product gas mixture having a different proportion of gases than the original mixture. Membranes which provide an adequately selective separation of the one or more desired gases and also exhibit a sufficiently high flux rate are preferred.

Membrane units have been used in conjunction with cryogenic separation units for the production of gaseous oxygen. In these systems, air is initially fed to a membrane where a nitrogen-rich stream is produced and subsequently vented to the atmosphere. The oxygen-rich permeate stream is fed to the cryogenic system to produce a purified gaseous oxygen stream. Examples of this type of process are described in Japanese Pat. Nos. 58-156173 and 58-151305.

BRIEF SUMMARY OF THE INVENTION

The present invention provides for an efficient process for the production of liquid and/or gaseous nitrogen from a feed gas stream comprising oxygen and nitrogen, such as air. This process comprises treating the feed gas stream in a cryogenic processing unit, and subsequently withdrawing at least a portion of the treated gas stream from said processing unit and introducing said stream into a membrane separation unit. In the membrane separation unit, the gas stream is separated to form a nitrogen-rich stream and an oxygen-rich stream. The nitrogen-rich stream is returned to the cryogenic separation unit for further treatment and separation to produce a purified liquid and/or gaseous nitrogen-rich product stream. Optionally, the oxygen-rich stream generated by the membrane separation unit can be returned to the cryogenic separation unit for further processing. Preferably, the feed gas stream is passed through a clean-up unit, such as a molecular sieve bed, to remove impurities prior to entering the cryogenic processing unit.

Incorporating one or more membrane units into a cryogenic cycle at some point, or points, can improve the efficiency and economics of the system. Specifically, incorporating a membrane unit allows a given cryogenic cycle to be operated efficiently at conditions that might be inefficient when operated on a stand-alone basis. Consequently, cryogenic cycles that were considered inefficient in the past may, when properly coupled with a membrane system, yield superior and feasible processes. This is due in part to the fact that, in the integrated system, use of the membrane provides an additional degree of freedom to adjust the process parameters for further optimization. Specifically, in a base cryogenic process the pressures of the various streams are set by the ambient pressure, whereas in the integrated cryogenic-membrane system this does not have to be the case. As a result, the overall efficiency of the system can be improved by the proper integration of the cryogenic process with one or more membrane units. For example, the advantages of the integrated process over the cryogenic process alone may include: significantly higher nitrogen recovery, a reduction in the size of equipment needed for the cryogenic separation unit, and the production of an enriched oxygen stream with a considerably higher oxygen concentration. These advantages can lead to significant power savings in the operation of the system.

DETAILED DESCRIPTION OF THE INVENTION

The present invention provides for an efficient process for separating components of a gas stream containing two or more components by the integration of one or more membrane units with a suitable cryogenic separation unit.

The gas stream is initially fed to a cryogenic processing unit where it undergoes cryogenic treatment. The specific cryogenic treatment will depend upon the composition of the gas stream being treated and the end product desired, but in any case will involve cooling and at least partial removal of one component of the gas stream. At least a portion; i.e., at least about 5% based on initial feed, of the treated gas stream is removed from the cryogenic separation unit and fed to a membrane separation unit. The amount withdrawn at this point is dependent upon equipment size and capacity, flow rates, desired end product purity, and optimization conditions. The withdrawn portion of the gas stream is partially separated in the membrane unit thereby forming a permeate stream and a reject stream. The type of membrane used is dependent upon its selectivity for the components which are to be separated and, hence, will vary with the make-up of the feed.

The feed to the membrane is partially separated to form a permeate stream and a reject stream. Depending upon the product desired, at least one of the streams from the membrane unit is returned to the cryogenic separation unit for further treatment; i.e. cooling and separation, to form a purified gaseous and/or liquid product.

While the present invention is especially adaptable for separating nitrogen and oxygen from air, it can be used for any gas stream which contains at least two components which have different permeability through a given membrane. Examples of such applications include separating hydrogen from ammonia purge gas; hydrogen from hydrocracker off gas; argon from ammonia purge gas; nitrogen from a nitrogen-methane mixture, etc.

Figure 1:
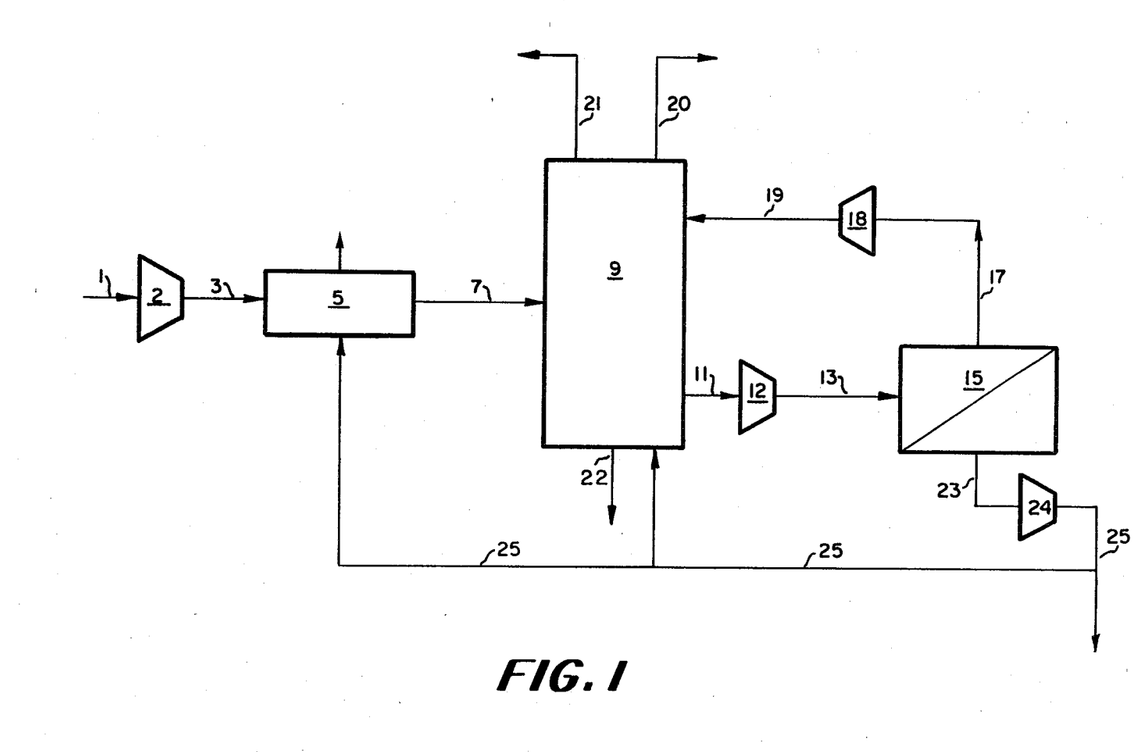
FIG. 1 is a general schematic flow diagram of the process of the present invention.

A general description of the process can be had by reference to FIG. 1. A gas stream 1 comprising nitrogen and oxygen is passed through a clean-up unit 5 to remove $CO_2$, $H_2O$ and any other impurities. While gas stream 1 can be any gas containing nitrogen and oxygen, air is most commonly used. Gas stream 1 is optionally passed through a compressor 2 to form a compressed feed stream 3 before being passed through the clean-up unit 5. Compression is optional and will depend upon the source of the gas stream 1 and the type of clean-up unit 5 employed. Any suitable clean-up system which is commonly known in the art can be used to remove impuritites from the gas stream. One example of such a clean-up unit is a unit comprising molecular sieve beds wherein one train is on line while an adjacent train is being regenerated. A clean gas stream 7 leaves the clean-up unit and is subsequently fed to the cryogenic process unit 9 where it undergoes cryogenic treatment in accordance with the type of product desired.

If liquid nitrogen is the predominant product of choice, the cryogenic process unit may consist of any suitable cryogenic cycle to separate nitrogen from the air, combined with a liquefier to produce liquid nitrogen, stream 20. Alternatively, both the separation and the liquefaction functions can be performed by the same cryogenic cycle. In this mode, gaseous nitrogen, stream 21, can still be one of the products as well as liquid nitrogen, stream 20.

If gaseous nitrogen is the predominant desired product, the cryogenic process can consist of any suitable cryogenic cycle to separate air and produce gaseous nitrogen, stream 21. A liquefier will not be needed in this case, however, a small quantity of liquid nitrogen, stream 20, can still be produced. The cryogenic system itself can be adjusted and altered to produce any desired mix of gaseous and liquid nitrogen.

Subsequently, at least a portion of the treated gas stream is withdrawn, as stream 11, from the cryogenic process unit 9 at an appropriate point in the cryogenic cycle. This treated gas stream 11 is optionally passed through a compressor 12 to produce a compressed stream 13 which is passed to a membrane separation unit 15. The membrane separation unit or units may be a single stage membrane device or, alternatively, a cascade of membranes to achieve even better separation of stream 13. Although FIG. 1 shows only one stream 11 leaving the cryogenic process unit 9 and serving as a feed to a single membrane separation unit 15, in practice one of more streams can be taken from the cryogenic process unit and fed to one or more membrane units. The number of streams taken from the cryogenic unit 9 as well as the composition, pressure, and temperature of the streams is dependent upon the cryogenic cycle used, and is adjusted so that the performance of the total plant is at its most optimal point.

The membrane separation unit 15 has some selectivity for separating nitrogen and oxygen when a pressure differential is maintained across the membrane. Typically, the oxygen permeability through the membrane is greater than that of nitrogen. The concentration of nitrogen in the reject stream 17 from the membrane separation unit is higher than its concentration in the compressed stream 13 entering the membrane. Typically, the pressure of this nitrogen-rich reject stream 17 is within a few psi of the compressed stream 13. The nitrogen-rich reject stream 17 is subsequently introduced at an appropriate point in the cryogenic process unit 9. If required by the cryogenic process, the pressure of the nitrogen-rich reject stream 17 may be increased to a desired level by passing it through a compressor 18 to provide a compressed nitrogen-rich stream 19. The compressed nitrogen-rich stream 19 undergoes further treatment and separation in the cryogenic separation unit 9 to produce one or more nitrogen-rich product streams. In the drawing, two product streams, 20 and 21, represent a liquid nitrogen-rich product stream and a gaseous nitrogen-rich product stream respectively, although it is understood that the nitrogen-rich product stream could be single phase. The nitrogen-rich product streams generally have a purity of greater than 99.7% and the system typically exhibits a total nitrogen recovery of greater than 75%. The gases separated from the nitrogen-rich stream in the cryogenic process unit 9 may exit the unit as stream 22 and can be recycled, discarded, or employed in any other applicable process.

An oxygen-rich permeate stream 23 leaves the membrane system and is optionally passed through a compressor 24 to produce an oxygen-rich compressed stream 25. In certain embodiments of the present invention the permeate side of the membrane unit may be at a pressure lower than ambient, and consequently compressor 24 may be replaced by a vacuum pump (not shown). The oxygen-rich compressed stream 25 may be a useful product, or it can be vented off as a waste from the plant. Additionally, at least a portion of the stream may be returned to the cryogenic unit for further treatment and recovery of any nitrogen present in the stream. Also, at least a portion of stream 25 may be passed through the water-carbon dioxide removal unit 5 as a regeneration gas.

A wide range of process conditions, including temperatures, pressures, flow rates, etc. can be employed in the present integrated cryogenic-membrane process to achieve optimum results depending upon the equipment used and the desired type and concentration of product. The examples below generated by computer simulation illustrate several of these various process schemes. These examples are meant only to be illustrative are not meant to limit the scope of the invention.

EXAMPLE 1

Figure 2:
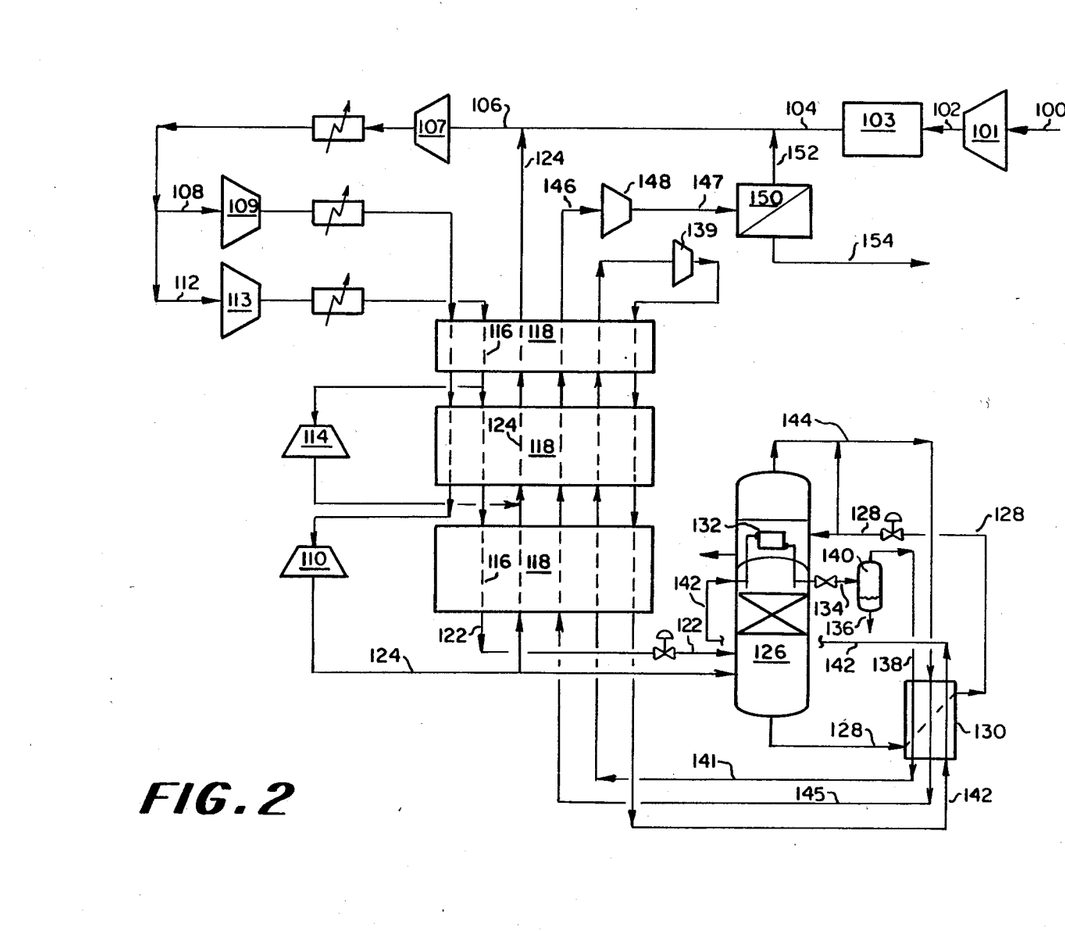
FIG. 2 is a specific flow diagram of one particular embodiment of the present invention.

An integrated cryogenic-membrane process was designed to produce liquid nitrogen as the main product. This process design is illustrated in FIG. 2, and represents a plant producing liquid nitrogen at a rate of about 74 tons/day.

An ambient air stream 100 is compressed by compressor 101 to provide stream 102 which is subsequently passed through a molecular sieve clean-up unit 103 to remove carbon dioxide and water. The purified stream 104 is mixed with the reject stream 152 from the membrane separation unit 150 and also with air-recycle stream 124 to form mixed stream 106. The mixed stream 106 is further compressed by compressor 107 and divided into two streams, 108 and 112. Stream 108 is compressed by compressor 109 which is driven by expander 110. Similarly, stream 112 is compressed by compressor 113 which is driven by expander 114. This arrangement provides refrigeration to the cryogenic plant.

A part of the compressed air stream 116 is condensed in the main heat exchanger 118 against the returning cold streams 124 and 146 to produce liquid air stream 122. This liquid stream 122, along with a portion of exhaust air stream 124 from expander 110 is fed to the bottom of a distillation column 126. Oxygen-rich liquid product 128 from the bottom of the distillation column 126 is cooled in a heat exchanger 130 and flahsed in a boiler/condenser 132 located at the top of the distillation column. The gaseous nitrogen stream at the top of the distillation column is condensed in the boiler/condenser to provide the liquid reflux at the top of the distillation column and a liquid nitrogen stream 134. Stream 134 is flashed to a lower pressure to give a liquid nitrogen product stream 136, at the desired pressure. The low pressure gaseous nitrogen stream 138 from the flash unit 140 is warmed in the heat exchanger 130 to form warm nitrogen stream 141 which is further warmed in main heat exchangers 118, compressed in compressor 139 to the required pressure, and cooled in the main heat exchangers 118 to form stream 142, which is further cooled in heat exchanger 130 and recycled to the distillation column 126.

Condensation of the gaseous nitrogen at the top of the boiler/condenser vaporizes the oxygen-rich stream 128 from the bottom of the distillation column 126 to provide a gaseous oxygen-rich stream 144, which is warmed in heat exchanger 130 to give oxygen-rich stream 145.

The oxygen-rich stream 145 is further warmed in the main heat exchangers 118 to form oxygen-rich stream 146 which is compressed by compressor 148 and subsequently cooled to form the feed 147 to the membrane unit 150. The membrane unit separates the feed into a reject stream 152 and a permeate stream 154.

Several variations of this process scheme were run altering the pressure of the feed stream 147 entering the membrane unit 150.

In Case I, the pressure of the feed stream 147 to the membrane unit 150 was chosen such that the pressure of the reject stream 152 is about the same as that of the air stream from the molecular sieve unit. In this case, the reject stream 152 could be directly mixed with the air stream 104 from the molesieve unit 103.

In case II, the feed 147 to the membrane unit 150 was at a much higher pressure than the air stream 104 leaving the molesieve unit 103. Providing a higher pressure feed to the membrane unit as well as a larger pressure differential across the membrane itself, allows for a smaller membrane to be used. The decrease in cost associated with using a smaller membrane, however, comes at the expense of an increase in power consumption to pressurize the feed.

Case III was run under the same process conditions as Case II, except that a membrane having a greater oxygen selectivity was employed.

The process conditions for Cases I-III are reported in Table 1 below.

TABLE 1

| | Stream | | | | | | | | | | | | |
|---|---|---|---|---|---|---|---|---|---|---|---|---|---|
| | 100* | | | 122 | 136 | 144 | 146 | 147* | | | 152* | | |
| | I | II | III | | | | | I | II | III | I | II | III |
| Temp (°C.) | 29 | 29 | 29 | −165 | −193 | −177 | 32 | 32 | 32 | 32 | 32 | 32 | 32 |
| Pressure (psia) | 14.7 | 14.7 | 14.7 | 625 | 20 | 52 | 50 | 100 | 270 | 270 | 96 | 265 | 265 |
| Flow Rate (lb moles/hr) | 332 | 319 | 310 | 300 | 220 | 492 | 492 | 492 | 492 | 492 | 381 | 393 | 403 |

*Represent variations for Cases I-III, as described above.

The results of running the process according to cases I-III were compared to operating the base cryogenic process without a membrane system. The process conditions reported in Table 1 were used for this comparison. The examples were carried out using air at 14.7 psia, 29° C., 50% relative humidity, and a liquid nitrogen production rate of about 74 tons/day. The results are reported in Table 2 below.

TABLE 2

| | Base | I | II | III |
|---|---|---|---|---|
| Pressure of stream 146 from the cryogenic process (psia) | 17.7 | 50.0 | 50.0 | 50.0 |
| Pressure of the feed to the membrane (psia) | — | 100 | 270 | 270 |
| $O_2/N_2$ permeability ratio | — | 7.5 | 7.5 | 10.0 |
| Overall nitrogen recovery (%) | 45 | 85 | 88 | 91 |
| Relative membrane area | — | 1.0 | 0.26 | 0.26 |
| Total power (kw) | 2082 | 1943 | 1970 | 1955 |

From the results reported in Table 2, it can be seen that the base cryogenic process without a membrane system recovers only about 45% of the nitrogen at a power requirement of about 2082 kw for a 74 ton/day operation. The nitrogen recovery for all the cryogenic-membrane systems is significantly higher, while operating at a lower power requirement. It is this higher nitrogen recovery at a lower power requirement which makes the integrated process a more efficient and economical system than using the cryogenic process along.

Since the air flow rate to the molecure sieve unit for the integrated cryogenic-membrane system is about half, and the pressure is about twice that of the base cryogenic unit, the size of the molecular sieve unit for the integrated system is significantly reduced.

As compared to the base cryogenic system, the pressures of all the streams in the heat exchanger for the integrated cryogenic-membrane unit are higher; and therefore in the later case, all the cryogenic equipment can be made smaller in size leading to a smaller heat exchanger. The reduction in size results in additional capital savings for the integrated system.

Additionally, the integrated system produces an oxygen-rich stream that is much richer in oxygen than that produced by the base cryogenic system and hence is a more useful product.

EXAMPLE 2

A number of runs were performed for the process in FIG. 2 to determine the effect of the pressure of the oxygen-rich effluent stream 146 leaving the cryogenic process unit. The results are summarized graphically in FIG. 3. The results of these runs shows that the overall power consumption of the integrated system was significantly lower than that of the base case over a wide range of pressures. The pressure at which the base cryogenic process can be operated is strictly limited by the constraints of the process. Additionally, it was seen that there is a tradeoff of opposing effects between the cryogenic process and the membrane unit. The net result of these opposing effects is that each process may operate at a point that is somewhat inefficient for that process, but when the processes are combined, a minimum in the power requirements occur.

Figure 3:
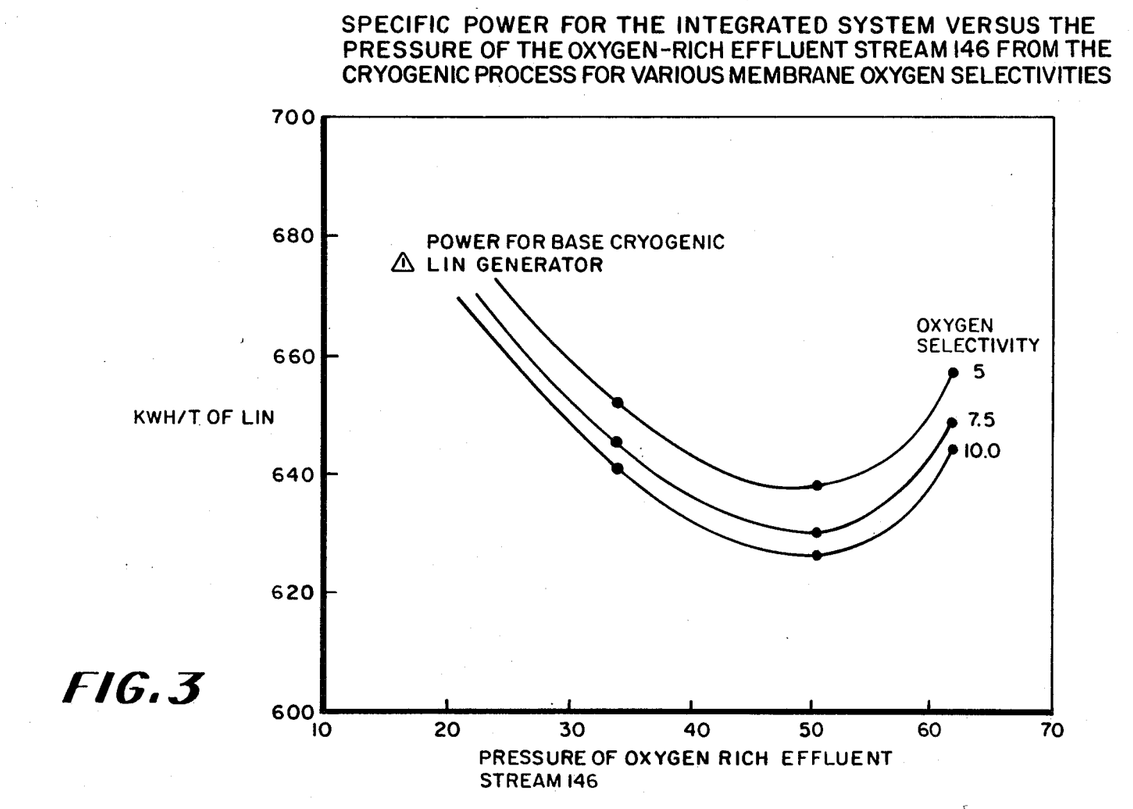
FIG. 3 is a graphical representation of the power requirements of the system shown in FIG. 2 as a function of the pressure of the partially treated gas stream leaving the cryogenic unit.

As seen in FIG. 3, the optimum pressure for the oxygen-rich stream, (Stream 146 in FIG. 2), is between 45–55 psia. The optimum pressure for this stream however, will vary depending on the particulars of the integrated process which is used.

EXAMPLE 3

Figure 4:
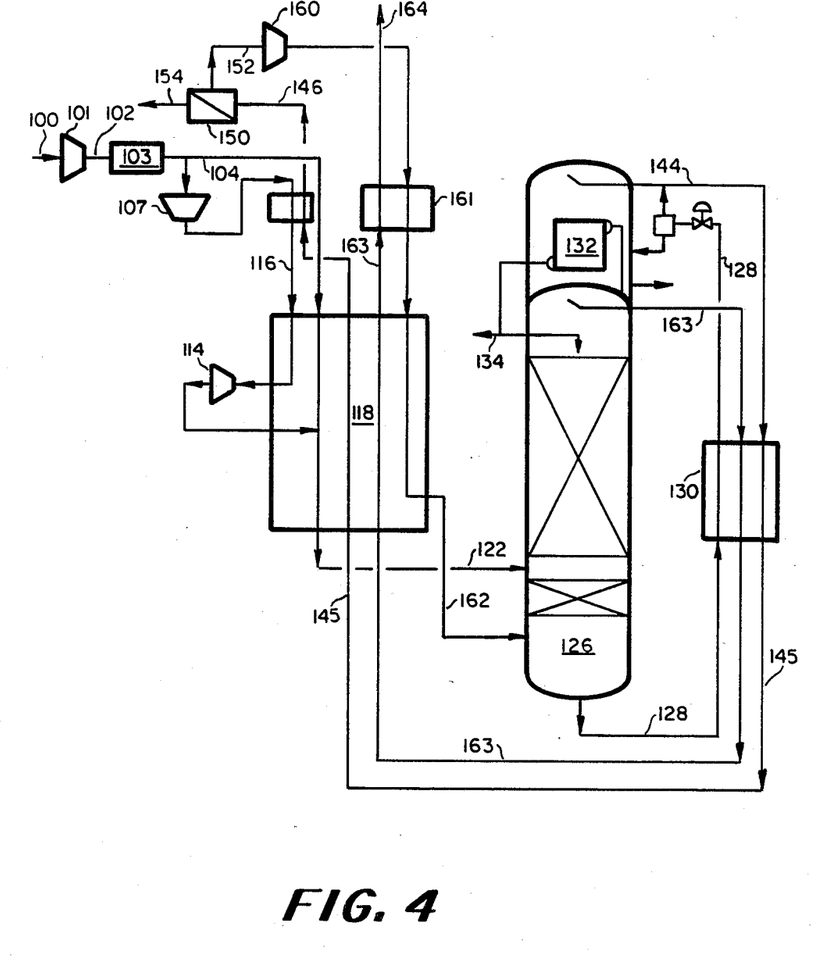
FIG. 4 is a specific flow diagram of another embodiment of the present invention.

A system as designed in accordance with the present invention wherein gaseous nitrogen is the primary product. This system is depicted in FIG. 4. Streams and equipment which are similar to and correspond to those in FIG. 2 are numbered the same and, except where necessary for clarity, are not discussed further.

A cooled air stream 122 is fed to distillation column 126, where it is treated to remove nitrogen and form an oxygen-rich stream 128 from the bottom of the distillation column. This oxygen-rich stream 128 is passed through heat exchanger 130 and into a boiler/condenser 132 at the top of the distillation column 126. An oxygen-rich stream 144 exits the boiler/condenser 132 at the top of the distillation column 126 and is warmed in heat exchanger 130 to provide a warmed oxygen-rich stream 145. This stream 145 is further warmed in heat exchanger 118 to provide stream 146 which is subsequently fed to the membrane unit 150 to produce reject stream 152 and permeate stream 154. The reject stream 152 from the membrane unit is compressed by compressor 160 and cooled in heat exchangers 161 and 118 to form a cooled feed 162 which is then fed to the distillation column 126 on an appropriate tray below the air feed. The cooled feed 162, along with the air feed 122 and previously removed nitrogen, is treated in the distillation column to form a nitrogen-rich stream 163 which is withdrawn from the top of the distillation column. Nitrogen-rich stream 163 is passed through heat exchangers 130, 118 and 161 to form gaseous nitrogen product stream 164. While the main product is collected as gaseous nitrogen, stream 164, some liquid nitrogen product may also be produced, stream 134. The concentration of oxygen in the gaseous nitrogen product stream is less than 5 ppm.

Results for operating this system using air at 14.7 psia, 29° C., 50% relative humidity and a gaseous nitrogen production rate of 87 tons/day at 115 psia are reported in Table 3 below. A small quantity of liquid nitrogen was also produced at a rate of 1.3 tons/day. Table 3 compares the results of this process with a base cryogenic process for producing gaseous nitrogen without a membrane system.

TABLE 3

|  | Base | Integrated Cryogenic-Membrane |
|---|---|---|
| Pressure of the oxygen-rich stream 146, from the cryogenic process (psia) | 17.1 | 55.0 |
| $O_2/N_2$ permeability ratio | — | 7.5 |
| Overall $N_2$ recovery (%) | 64 | 87 |
| Oxygen concentration in the feed to the membrane (%) | — | 42 |
| Oxygen concentration in the reject from the membrane (%) | — | 29 |
| Total Power Consumption (kw) | 671 | 645 |

The results reported in Table 3 show that the overall recovery of nitrogen, based on the air feed, is 87% for the integrated cryogenic-membrane process as compared to only 64% for the base cryogenic process. The integrated system achieves this greater recovery while operating at a lower total power consumption than the base process.

The above examples illustrate several processes which can be designed by integrating a cryogenic process system with a membrane separation unit. Any number of additional process schemes could be developed in accordance with the present invention. For example, such process schemes could vary the type of cryogenic process used, the type and size of membrane used, the composition of the product, the composition of the feed, and/or the amount of the product which is in the liquid and/or gas phase.

Having thus described the present invention, what is now deemed appropriate for Letters Patent is set out in the following appended claims.

What is claimed is:

1. A process for the production of gaseous and/or liquid nitrogen from a feed gas stream comprising nitrogen and oxygen, said process comprising providing an additional degree of freedom for adjusting the process parameters by:
   (a) feeding said feed gas stream comprising nitrogen and oxygen to a cryogenic separation unit to treat said gas stream;

(b) withdrawing at least a portion of the treated gas stream from the cryogenic separation unit;

(c) feeding said portion of the treated gas stream to a membrane unit wherein said stream is separated to form a nitrogen-rich stream and an oxygen-rich stream;

(d) returning said nitrogen-rich stream to the cryogenic separation unit for further treatment and separation; and (e) subsequently recovering a purified liquid and/or gaseous nitrogen-rich product stream.

2. The process in accordance with claim 1 wherein at least a portion of said oxygen-rich stream is returned to the cryogenic separation unit for further processing.

3. The process in accordance with claim 2 wherein said oxygen-rich stream is passed through a compressor prior to being returned to the cryogenic separation unit.

4. The process in accordance with claim 1 wherein the feed gas stream comprising nitrogen and oxygen is air.

5. The process in accordance with claim 4 wherein the feed gas stream is passed through an $H_2O$ and $CO_2$ removal unit prior to being fed to the cryogenic separation unit.

6. The process in accordance with claim 5 wherein said $H_2O$ and $CO_2$ removal unit contains one or more molecular sieve beds.

7. The process in accordance with claim 6 wherein a portion of said oxygen-rich stream is used to regenerate the molecular sieve beds.

8. The process in accordance with claim 7 wherein said feed gas stream is passed through a compressor prior to entering the $H_2O$ and $CO_2$ removal unit.

9. The process in accordance with claim 1 wherein said treated gas stream which is withdrawn from the cryogenic separation unit is passed through a compressor prior to entering the membrane unit.

10. The process in accordance with claim 1 wherein said nitrogen-rich stream from the membrane unit is passed through a compressor prior to being returned to the cryogenic separation unit.

11. The process in accordance with claim 1 wherein the total nitrogen recovery, based on the feed stream, is at least 75%.

12. The process in accordance with claim 1 wherein the nitrogen product has a purity of at least 99.7%.

13. The process in accordance with claim 1 wherein the oxygen-rich stream is recovered as product.

14. A process for the production of liquid nitrogen from an air feed stream, said process comprising providing an additional degree of freedom for adjusting the process parameters by:

(a) passing said air feed stream through a molecular sieve bed to remove water and carbon dioxide, thereby producing a nitrogen/oxygen-rich gas stream;

(b) condensing at least a portion of the nitrogen/oxygen-rich gas stream in a cryogenic processing unit to produce a liquid nitrogen/oxygen stream;

(c) passing said liquid nitrogen/oxygen stream to a distillation column where it is treated to form an oxygen-rich liquid stream and a gaseous nitrogen stream;

(d) condensing said gaseous nitrogen stream to produce a liquid nitrogen stream;

(e) reducing the pressure of said liquid nitrogen stream to produce a nitrogen product stream;

(f) vaporizing said oxygen-rich liquid stream in step (c) to form a gaseous oxygen-rich stream;

(g) passing said gaseous oxygen-rich stream to a membrane unit for separation into a oxygen-rich permeate stream and a nitrogen-containing reject stream; and (h) passing said nitrogen-containing reject stream back through the cryogenic processing unit.

15. The process in accordance with claim 14 wherein the pressure of the gaseous oxygen-rich stream passed to the membrane unit is chosen such that the pressure of the nitrogen-containing reject stream from the membrane unit is about the same as the pressure of the nitrogen/oxygen-rich gas stream leaving the molecular sieve bed.

16. The process in accordance with claim 14 wherein the pressure of the gaseous oxygen-rich stream passed to the membrane unit is chosen such that the pressure of the nitrogen-containing reject stream from the membrane unit is significantly higher than the pressure of the nitrogen/oxygen-rich gas stream leaving the molecular sieve bed.

17. A process for the production of gaseous nitrogen from an air feed stream, said process comprising providing an additional degree of freedom for adjusting the process parameters by:

(a) passing said air feed stream through a molecular sieve bed to remove water and carbon dioxide, thereby producing a nitrogen/oxygen-rich gas stream;

(b) cooling said nitrogen/oxygen-rich gas stream;

(c) treating said cooled nitrogen/oxygen-rich gas stream in a distillation column to remove nitrogen thereby forming an oxygen-rich stream;

(d) passing said oxygen-rich stream to a membrane unit where it is separated to form a permeate stream and a reject stream;

(e) returning said reject stream to the distillation column where it is treated along with the nitrogen/oxygen-rich gas stream of step (c) to form a nitrogen-rich stream;

(f) withdrawing said nitrogen-rich stream from the distillation column; and (g) heating said nitrogen-rich stream in a series of heat exchangers to produce a gaseous nitrogen product stream.

18. A process for separating components of a gas stream containing at least two components having different permeability through a given membrane, process provides an additional degree of freedom for optimizing said process comprising providing an additional degree of freedom for adjusting the process parameters by:

(a) feeding said gas stream to a cryogenic separation unit to treat said gas stream;

(b) withdrawing at least a portion of the treated gas stream from the cryogenic separation unit;

(c) feeding said portion of the treated gas stream to a membrane unit to form a premeate stream and a reject steam;

(d) returning at least one of the streams from the membrane unit to the cryogenic separation unit for further treatment and separation to form a purified stream; and (e) subsequently recovering said purified stream as a gaseous and/or liquid product.

* * * * *

UNITED STATES PATENT AND TRADEMARK OFFICE
CERTIFICATE OF CORRECTION

PATENT NO. : 4,595,405

DATED : June 17, 1986

INVENTOR(S) : R. Agrawal et al

It is certified that error appears in the above-identified patent and that said Letters Patent is hereby corrected as shown below:

Column 10, Line 6
　　Delete "a" and substitute therefor -- an --

Column 10, Line 51
　　Delete "process"

Column 10, Line 52
　　Delete "provides an additional degree of freedom for optimizing"

Column 10, Line 60
　　Delete "premeate" and substitute therefor -- permeate --

Signed and Sealed this

Twenty-first Day of October, 1986

[SEAL]

Attest:

DONALD J. QUIGG

Attesting Officer

Commissioner of Patents and Trademarks